No. 872,827. PATENTED DEC. 3, 1907.
A. V. LEGGO.
RABBLE SHAFT AND ARM FOR FURNACES.
APPLICATION FILED APR. 6, 1906.
2 SHEETS—SHEET 1.
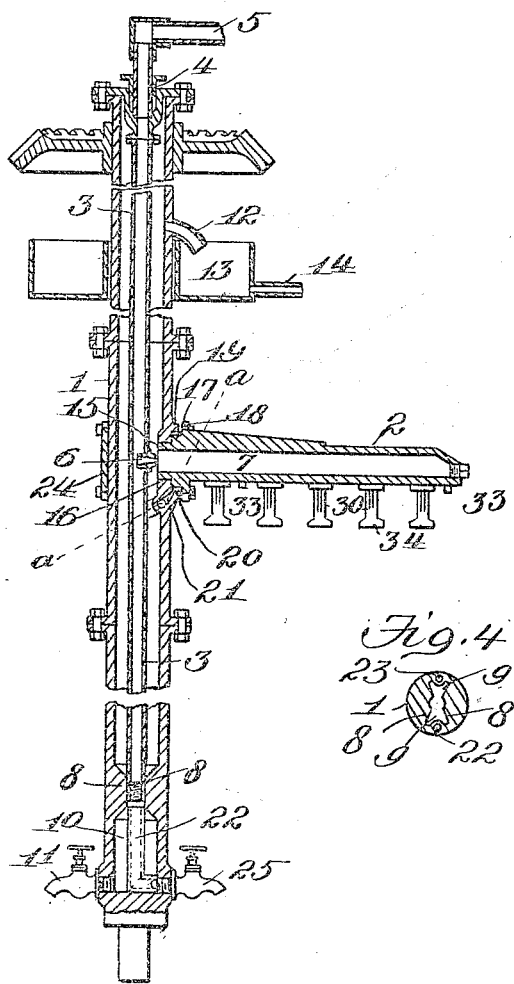

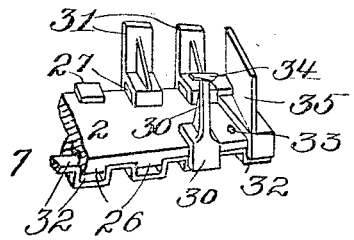
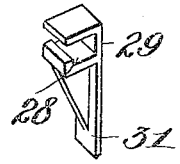
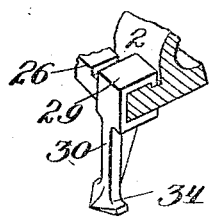
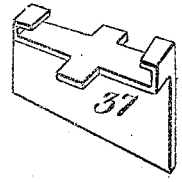
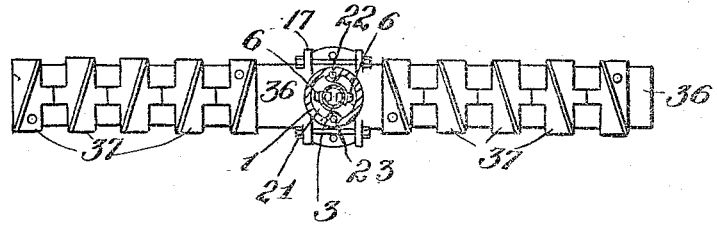

UNITED STATES PATENT OFFICE.

ARTHUR VICTOR LEGGO, OF BALLARAT, VICTORIA, AUSTRALIA.

RABBLE SHAFT AND ARM FOR FURNACES.

No. 872,827.   Specification of Letters Patent.   Patented Dec. 3, 1907.

Application filed April 6, 1906. Serial No. 310,324.

*To all whom it may concern:*

Be it known that I, ARTHUR VICTOR LEGGO, a subject of the King of Great Britain, residing at Pendeen, Dawson street, Ballarat, in the State of Victoria and Commonwealth of Australia, have invented certain new and useful improvements in and connected with rabble shafts and arms for furnaces for roasting, desulfurizing, chloridizing, dehydrating, or drying ores and other substances, of which the following is a specification.

This invention relates to improvements in and connected with rabble shafts and arms for furnaces for roasting, desulfurizing, chloridizing, dehydrating, or drying ores, and other substances, and has been devised principally in order to provide means for more simply and effectually circulating a cooling agent, such as water, throughout the said rabble shaft and arms, than any at present in use.

In carrying out my invention I prefer to make the rabble shaft in sections and bolt them together, but when more convenient they may be cast in one piece. The said shafts are hollow and provided with a central vertical down pipe, to the top of which is connected a supply pipe for delivering the cooling agent thereto. I provide the down pipe with a jet for each rabble arm attached to the shaft. Said jet does not enter the rabble arms but is so positioned that it directs a stream of water along the center of the hollow rabble arm. The water in the down pipe is maintained at any suitable pressure, and the velocity with which the water enters the rabble arm from this jet causes a central current of cool water to flow from the inner to the outer end of the arm, which in turn is heated and displaced by the cool water continuously injected, the heated water from all the arms returning to the rabble shaft and escaping through an overflow pipe situated in the top thereof. A continuous circulation of water is thus effected through each arm to keep it cool. The down pipe with the jets can be withdrawn from the rabble shaft through the top thereof for the purpose of renewal or repairs without interfering in any way with the rabble shaft or arms in the furnace.

My invention also consists in the combination with a rabble arm constructed as described of two rows of removable teeth one on either side thereof the front row being narrower than those constituting the back row. Both rows of teeth are set at equal distances apart, the front or narrow teeth being formed with broad feet which feet approximate in width to the spaces between the back teeth. The teeth are so placed on the rabble arm as that when the rabble arm is in motion the paths of the front teeth are immediately between the paths of the back teeth.

In cases where the rabble arms fitted with removable teeth as previously described are used in furnaces in which the inclination of the hearths is not sufficient to cause the ore to pass through the furnace with sufficient rapidity, I may remove some of the end teeth and substitute therefor one or more teeth so constructed as that they offer oblique surfaces to the ore whereby it is forced more rapidly from the path of one arm to that of the next. To retard the passage of the ore the oblique teeth are reversed.

In order to enable the teeth to be attached to and removed from the rabble arm I provide rectangular projections both on the top and bottom of the rabble arm. Recesses are formed in the jaws of both the front and back teeth to enable them to pass over and engage with the projections aforesaid. The teeth are kept in their proper position by means of spacing bars which are attached to the arm by means of pins passing through said spacing bars and arm. In order to enable oblique teeth to be substituted for some of the end teeth these oblique teeth are provided with two jaws having suitable recesses to enable them to engage with and pass over and along the said arm.

In some cases it may be desirable to use a double, instead of a single rabble arm, in which case I dispense with the projections on the arm, and substitute for the teeth constructed as before described, oblique teeth set at a different angle on one side of the rabble shaft to those on the other. By this means the ore left stagnant by the teeth on one arm is stirred by those on the other.

Referring now to the drawings,—Figure 1 is a sectional elevation of a rabble shaft and arm constructed according to my invention. Fig. 2 is a plan of Fig. 1. Fig. 3 is a cross section of the rabble arm shown in Fig. 1. Fig. 4 is a cross section of the rabble shaft on the obliquely dotted line $a, a$, Fig. 1. Fig. 4ª is a further section on the line $b—b$, of Fig. 1. Fig. 5 is a perspective view of that portion of the rabble shaft to which the rabble arm is attached. Fig. 6 is a perspective view of portion of a rabble arm inverted, with teeth attached. Fig. 7 is a perspective view of a back tooth. Fig. 8 is a perspective view of a front tooth. Fig. 9 is a perspective view of a spacing bar. Fig. 10 is an inverted plan of a double rabble arm having oblique teeth. Fig. 11 is a perspective view of an oblique tooth for attachment to the double rabble arm shown in Fig. 10.

1 represents the rabble shaft. 2 is the rabble arm attached thereto. 3 is the central vertical down pipe in said rabble shaft, the top of which down pipe is attached to the stuffing box 4 which is bolted to the top of the rabble shaft. 5 is a supply pipe which enters the stuffing box 4 and delivers the cooling agent to the down pipe 3. 6 is the jet in the said down pipe 3 situated immediately opposite the center of the opening 7 in the rabble arm 2. Said jet 6 may be screwed into or otherwise affixed to the down pipe 3.

8 are projections on the inside of the rabble shaft, and near the bottom of the down pipe 3. Between the said projections 8 are openings 9 through which the water in the rabble shaft 1 passes to the sump 10 in the bottom thereof. 11 is a tap to withdraw the water from said sump 10 when it is desired to cleanse the shaft 1 of any solid matter deposited in it without withdrawing the rabble shaft from the furnace.

12 is an overflow pipe near the top of and through which the heated water escapes from the rabble shaft 1.

13 is a trough having a pipe 14 attached to the bottom thereof for the purpose of conveying the water therefrom.

On one end of the rabble arm 2 is a neck 15, which enters a hole 16 in the rabble shaft 1. The shaft 1 is thickened round the hole 16 (see Fig. 5) both to give strength to the shaft at this point and to provide a greater bearing surface for the neck 15 on the end of the rabble arm 2. Between the neck 15 and the flange 17 on the arm 2 is a collar 18, which is of smaller diameter than the inside of the annular ring 19 cast integrally with and on the side of the rabble shaft 1. The space between the outside of the collar 18 and the inside of the annular ring 19, when the arm is in position, forms an annular recess 20, which directs any leakage of water, at the junction of the rabble shaft 1 and the rabble arm 2, to the passage 21 leading to one or other of the passages 22 and 23, which pass down opposite sides of the rabble shaft 1 to the bottom of the said shaft, where they meet. The rabble arm 2 is securely fastened to the rabble shaft 1 by means of bolts passing through the flanges 17 of the arm 2 and the coupling piece 24 situated on the opposite side of the said shaft 1.

The rabble arms may if preferred, be keyed to the rabble shaft, and the means shown in the drawings permit, by the use of suitable tools, of their being renewed or replaced from the outside of the furnace, thereby obviating the necessity for cooling down the furnace to effect repairs. When there is much leakage of water from the junction of said rabble shaft 1 and said rabble arm 2, the small space between the edge of the annular ring 19 and the flange 17 when the arm is in position can be calked with asbestos fiber, or other suitable material. The two passages 22 and 23 are only required, when these rabble shafts are made in sections. When the rabble shaft is cast in one piece, only one of these passages 22 or 23 will be required, and the passages 21 all made to lead to it. 25 is a tap to withdraw the contents from the said passages 22 and 23.

26 are rectangular projections on the top, and 27 rectangular projections on the bottom, of the rabble arm 2, over which the recesses 28 formed in the jaws 29 of the front and back teeth 30 and 31 respectively are passed. 32 are spacing bars to keep the teeth forming any row at given distances apart. 33 are pins which pass through and hold the said spacing bars 32 to the rabble arm. The back teeth 31 are broader than the front teeth 30, and their effect on passing through the ore is to form deep furrows in it, thereby exposing as great a surface of ore as possible in a given hearth area. The front teeth 30 are narrower, and have at their bottom end a broad foot 34. These front teeth 30 immediately preceding as they do the back teeth 31, effectively open up the ridges of ore forming the furrows made by the back teeth on the previous revolution of the rabble, and a very thorough and frequent exposure of the ore particles to the oxidizing atmosphere is thereby attained. To connect the said teeth 30 and 31 to the rabble arm 2, the jaws 29 are passed over the arm between the rectangular projections 26 and 27, and then slid along the arm until the recess 28 formed in the jaws 39 covers the said projections, when the teeth will be firmly secured. When the inclination of the hearths is found to be insufficient to cause the ore to pass through the furnace with sufficient rapidity, I remove some of the end teeth 30 and 31 of the rabble arm, and substitute one or more teeth 35, which are so constructed as that they offer oblique surfaces to the ore, and force it more rapidly from the path of one arm to that of the next. When it is desired to retard the passage of the ore through the furnace, the teeth 35 are reversed, when the required result will be effected.

36 (see Fig. 10) illustrates a double-rabble arm, fitted with oblique teeth 37, those on one arm stirring the ore left stagnant by those on the other, and the teeth on one arm being placed at the opposite angle to those on the other arm, so that when in motion the outwardly-throwing effect of those on the one arm will be counteracted by the inwardly-throwing effect of those on the other. It is quite obvious that rabble shafts with more than two rabble arms attached above each hearth may be used, and the paths of the rabble arms of one shaft can overlap those of the rabble shaft or shafts next adjacent without coming into contact, so long as the rabble shafts are made to rotate alternately in right and left hand directions.

The rabble shaft 1 is driven by worm or bevel gearing situated above or below the furnace or in any other approved manner.

What I do claim as my invention, and desire to secure by Letters Patent, is:—

1. In an apparatus of the class described, a rabble arm having projections on the top and bottom thereof, and a plurality of removable teeth having recesses forming jaws for engagement with the projections.

2. In an apparatus of the class described, a rabble arm having projections at the top and bottom thereof, a plurality of teeth, one or more of the same having feet, and jaws associated with said teeth at the opposite ends for detachable engagement with the projections on the rabble arm.

3. In an apparatus of the class described, a rabble arm having projections at the top and bottom thereof, a plurality of teeth, one or more of the same having feet, jaws associated with said teeth at the opposite ends for detachable engagement with the projections on the rabble arm, and spacer bars interposed between the teeth and projections for holding the teeth suitably spaced from each other.

4. In an apparatus of the class described, a double rabble arm having projections at its opposite side edges, oblique teeth carried by the respective arms, one series of the teeth carried by one arm arranged at an angle opposite to the series of teeth carried by the other arm, jaws formed integral with each of the teeth for detachable engagement with the projections, and means associated with the teeth for spacing the same from each other.

5. In an apparatus of the class described, a rabble arm having projections at the top and bottom thereof at opposite sides, a front row of teeth detachably engaging one series of the projections, a back row of teeth removably engaging the remaining series of the projections, the front row of teeth being narrower than the back row of teeth, said teeth having jaws for engagement with the projections, a spacing bar for holding the teeth a suitable distance from each other, and means for locking the spacing bars in position on the rabble arm.

In testimony whereof I have hereunto set my hand in presence of two subscribing witnesses.

ARTHUR VICTOR LEGGO.

Witnesses:
  WALTER S. BAYSTON,
  FRANK BAYSTON.